(12) United States Patent
Enderlein et al.

(10) Patent No.: US 7,761,096 B2
(45) Date of Patent: Jul. 20, 2010

(54) METHOD FOR LOGGING A RADIO MODULE INTO A CELLULAR RADIO NETWORK

(75) Inventors: Janos-Gerold Enderlein, Berlin (DE); Dieter Pfitzmann, Berlin (DE)

(73) Assignee: Cinterion Wireless Modules GmbH, Munich (DE)

( * ) Notice: Subject to any disclaimer, the term of this patent is extended or adjusted under 35 U.S.C. 154(b) by 1102 days.

(21) Appl. No.: 10/568,298

(22) PCT Filed: Apr. 29, 2005

(86) PCT No.: PCT/DE2005/000826

§ 371 (c)(1),
(2), (4) Date: Feb. 14, 2006

(87) PCT Pub. No.: WO2005/120111

PCT Pub. Date: Dec. 15, 2005

(65) Prior Publication Data

US 2006/0286979 A1     Dec. 21, 2006

(30) Foreign Application Priority Data

Jun. 1, 2004    (DE) .................. 10 2004 027 350

(51) Int. Cl.
*H04W 8/02* (2009.01)

(52) U.S. Cl. .................. 455/435.1; 455/433; 455/450

(58) Field of Classification Search .................. 455/450, 455/435.1, 433
See application file for complete search history.

(56) References Cited

U.S. PATENT DOCUMENTS

| 5,481,610 A * | 1/1996 | Doiron et al. ............... 380/270 |
| 6,249,681 B1 * | 6/2001 | Virtanen ..................... 455/466 |
| 2002/0109676 A1 | 8/2002 | Pochmuller et al. |
| 2003/0061503 A1 * | 3/2003 | Katz et al. .................. 713/200 |
| 2003/0076808 A1 | 4/2003 | McNiff et al. |
| 2005/0025176 A1 * | 2/2005 | Ko et al. ..................... 370/448 |
| 2006/0063544 A1 * | 3/2006 | Zhao et al. .................. 455/510 |

FOREIGN PATENT DOCUMENTS

WO    WO2004043092    *    5/2004

* cited by examiner

*Primary Examiner*—Charles N Appiah
*Assistant Examiner*—William F Rideout
(74) *Attorney, Agent, or Firm*—Baker Botts L.L.P.

(57) ABSTRACT

A method for logging a radio module into a cellular radio network, where the radio module automatically logs into the radio network when it is turned on by virtue of it transmitting a login message to the radio network, the radio network storing login data for the radio module and the login data being deleted again when the radio module logs out. In response to an autoreset signal in the radio a controlled autoreset is triggered in which the radio module temporarily turns off and then on again or temporarily deactivates from the radio network and then registers again.

20 Claims, 7 Drawing Sheets

METHOD FOR LOGGING A RADIO MODULE INTO A CELLULAR RADIO NETWORK

FIELD OF TECHNOLOGY

The present disclosure relates to a method for logging radio modules into cellular radio networks.

BACKGROUND

Radio modules are increasingly used for M2M (machine-to-machine) applications. Typical areas of application are wireless control and regulation functions, inspection and monitoring functions and telemetric tasks, for example. On account of the very good network availability, such M2M radio modules primarily support cellular radio standards such as GSM or UMTS.

Providers of such radio networks place great value on effective utilization of their extended network capacities and therefore prefer mobile terminals which generate a large volume of call or data traffic. In contrast to this, mobile terminals which produce no data traffic for a relatively long period are no longer supported by the network operators and are logged out of the network.

However, an M2M radio module which has logged out now has only very restricted functional use. Although the M2M radio module can still independently initiate data traffic, because in this case it logs itself in again, it can no longer be addressed externally and therefore cannot receive any commands. This counteracts any great advantage of the radio module in M2M applications.

As a remedial solution, M2M radio modules that have been logged out by a provider can be logged in again manually. However, this requires direct action on the radio module, which is contrary to the desired pure remote operation and maintenance by radio.

Another option for keeping an M2M radio module constantly logged in is for data records to be sent periodically with a period length which is shorter than the maximum login time permitted by the provider. Such pseudo data traffic gives rise to unnecessary costs, however.

SUMMARY

Accordingly, a solution may be found by anticipating and forestalling enforced logout from the radio network or automatically reacting immediately to the logout. In each case, the aim here is to prevent or automatically reverse enforced logout. This can be done in a simple manner by utilizing the login process which is initiated anyway when turning on. In this case, available functionalities are used when automatically turning off and on. Alternatively, the fresh login process can also be initiated independently of turning on and off.

The solution has the advantage that the module can no longer be forced to be disconnected by the network. Unnecessary costs which pseudo data traffic would incur just in order to allow residence in the radio cell are substantially reduced. The M2M radio module can thus easily be addressed at any required time and can thus be operated remotely by radio.

Advantageously, the autoreset signal is produced a the radio module is logged out of the radio network. The method thus reacts precisely at the correct moment to automatic disconnection of the radio network and maximizes its logged-in time in a very simple manner.

Alternatively, the autoreset signal can also produced in a radio module as soon as a predetermined time interval has elapsed. In this case, it is known from the outset in what (short) time periods during the autoreset the radio module cannot be addressed externally. This also ensures that after said time interval and the known period of the autoreset phase have elapsed the radio module can be addressed in all cases.

Preferably, the radio module waits a second time interval between turning off and turning on again in the event of the autoreset. This is advantageous if it is known from the outset that the radio module is not required for a certain time anyway. By way of example, this allows the lifetime of a battery for supplying power to the relevant appliance to be increased or else the radiation from the radio module to be reduced.

In another preferred embodiment, the radio module turns on again immediately after the autoreset. This minimizes the time period in which the radio module cannot be addressed.

Preferably, the first and/or second time interval can be set, particularly by radio command. This allows both time intervals to be adapted and synchronized with an external time control on the basis of the use of the radio module. The two time intervals can thus be optimized in respect of required activity times for the radio module, the maximum permissible login period in the radio network or else the operating period of a battery charge.

The maximum login time, after which the radio network logs out the radio module, and/or activity intervals, are preferably determined in which the radio module is supposed to be. This information is adaptively used to determine the first and/or second time interval(s). In this context, these parameters, namely maximum login time or activity intervals for the radio module, do not need to be known a priori, but rather are not ascertained until during operation. Good optimization can be achieved particularly when these parameters are matched adaptively.

Preferably, the first time interval is restarted when the radio module sends data to the radio network. This is because sending/receiving data restarts the maximum permissible login time with the very provider of the radio network.

Advantageously, data from volatile memory areas of the radio module are stored in nonvolatile form or outside the latter before the autoreset for the radio module and are written back to the volatile memory areas after it is turned on/restarted. This allows sensitive data, data which are complex to evaluate or data which are important for other reasons to be retained, and hence the radio module loses no important information and hence functionality as a result of the autoreset.

In this context, the cellular radio network is advantageously a GSM network, a GPRS network, a UMTS network or an EDGE network; these also include a WLAN below, however. Since the inventive idea is independent of the exact radio standard, this allows a reliable M2M application to be implemented in all important current standards.

BRIEF DESCRIPTION OF THE DRAWINGS

The various objects, advantages and novel features of the present disclosure will be more readily apprehended from the following Detailed Description when read in conjunction with the enclosed drawings, in which.

DETAILED DESCRIPTION

Figure 1:
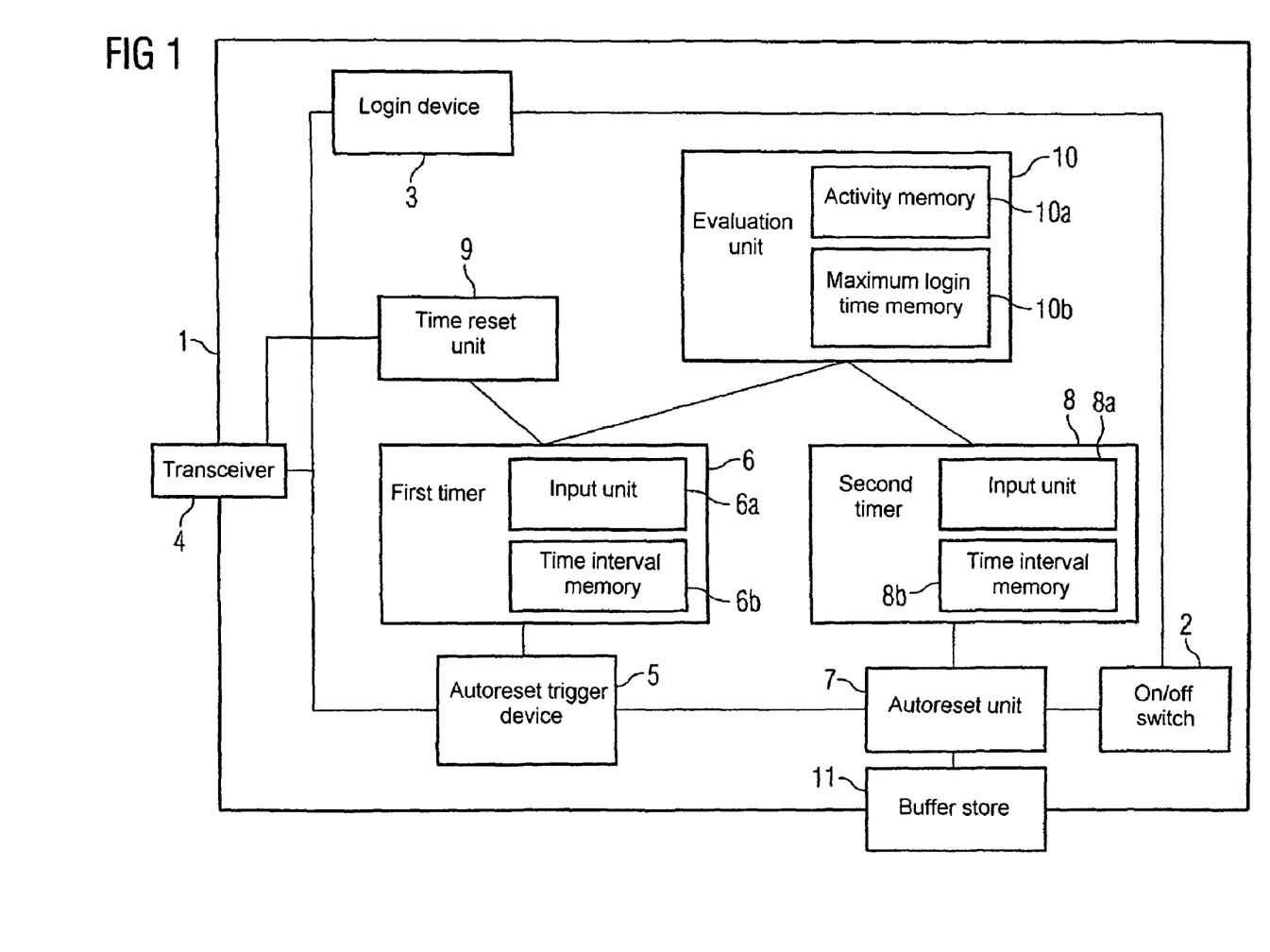
FIG. 1 illustrates an exemplary arrangement of the functional devices in a radio module under a present embodiment.

FIG. 1 schematically shows the functional units of a radio module 1 under an exemplary embodiment. The radio module 1 is activated and deactivated using an on/off switch 2. Activation by the on/off switch 2 triggers a login operation in a login device 3, this operation being used by the radio module 1 to register in a radio network by a transceiver 4. This login operation is described in more detail later in connection with FIG. 3.

An autoreset trigger device 5 is connected to the transceiver 4 and to a first timer 6. This autoreset trigger device 5 is able to receive signals from the transceiver 4 or the first timer 6 and, having evaluated them, transmitting an autoreset signal to an autoreset unit 7. The autoreset unit 7 triggers a controlled autoreset upon receiving the autoreset signal.

In the event of an autoreset, the autoreset unit 7 prompts temporary deactivation and subsequent activation of the radio module 1 using the on/off switch 2. Since activation of the radio module 1 using an on/off switch 2 triggers the login operation in the login device 3, an autoreset ensures that the radio module 1 logs into the radio network again. Alternatively, it is possible for not the entire radio module 1 to be turned off and on, but rather for just a logout operation with a subsequent login operation to be triggered.

The autoreset unit 7 has a second timer 8 connected to it which prescribes a time interval defining the duration of the deactivation phase for the autoreset. Both the first timer 6 and the second timer 8 are respectively provided with an input unit 6a, 8a and a time interval memory 6b, 8b. The input unit 6a, 8a can be used to input and store a first time interval t_cycle_on and a second time interval t_cycle_off. This input can be made either directly on a module or by radio. The time interval t_cycle_on defines the length of time for which the radio module remains activated and logged in before an autoreset is triggered. Secondly, the time interval t_cycle_off defines that period of time for which the radio module remains deactivated or turned off or logged out during the autoreset.

The first timer 6 has a time reset unit 9 connected to it. This time reset unit 9 monitors whether there has been any data traffic via the transceiver 4. In this case, the first timer 6 is reset. The effect achieved by this is that the time interval t_cycle_on is restarted as soon as the radio module 1 has caused any data traffic. Finally, an evaluation unit 10 is also provided with an activity memory 10a and with a maximum login time memory 10b, the evaluation unit 10 being connected to the first and second timers 6, 8 and being able to define the times t_cycle_on and t_cycle_off using their input units 6a, 8a. To this end, the activity memory stores times at which the radio module 1 has been active, i.e. has sent or received data, and the maximum login time memory stores times which, after they have elapsed, prompt the radio network to log out the radio module 1. In this way, the evaluation unit 10 can optimize the two times t_cycle_on and t_cycle_off. This optimization process is described in more detail later in connection with FIG. 5.

So that no data are lost during the autoreset, important data are stored in a buffer store 11. This buffer store is either nonvolatile, for example a Flash or magnetic memory, or is independent of the power supply for the radio module 1 and is therefore not erased by the autoreset. This means that important data can be buffered and the radio module 1 is immediately in the old operating state again after being turned on again.

Figure 2:
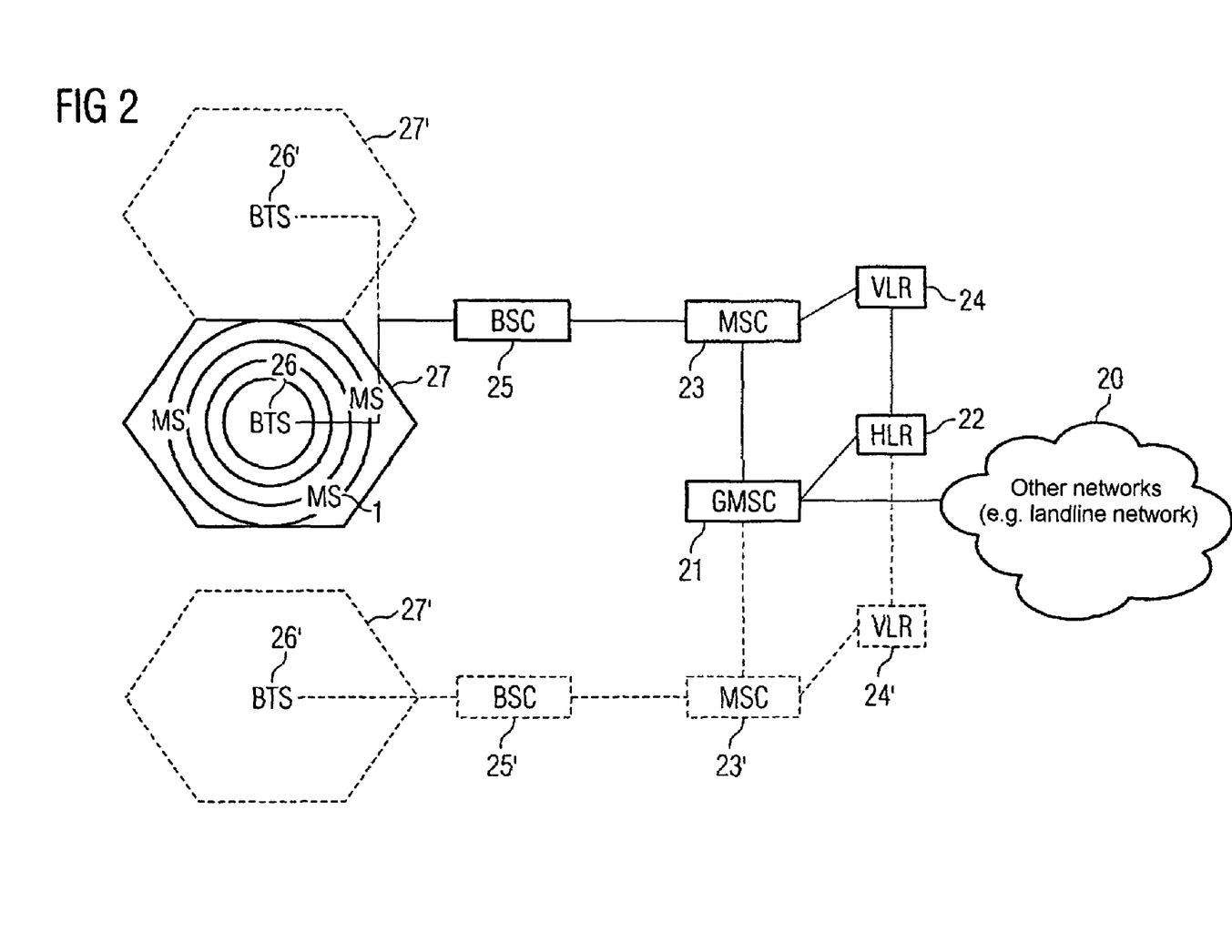
FIG. 2 is a schematic illustration of a GSM network.

FIG. 2 illustrates a GSM network as an associated radio network for the radio module. The GMSC 21 (Gateway Mobile Switching Center) acts as an interface between the GSM network and other networks, such as the landline network 20. The GSMC 21 has access to HLR 22 (Home Location Register) which stores user data centrally for all the users of the GSM network. In addition, the GSMC 21 is connected to a multiplicity of MSCs 23, 23' (Mobile Switching Center), which each serve as an exchange in a particular region.

In this case, each MSC 23 has access to a VLR 24 (Visitor Location Register), which stores copies of the user data from the HLR 22 for those users who are in the area of responsibility of the MSC 23.

Each MSC 23 is connected to a multiplicity of base stations BTS 26, 26' (Base Transceiver Station) via a BSC 25 (Base Station Controller). Each of these base stations 26, 26' provides radio coverage for an associated radio cell 27, 27'. The radio cell 27 contains mobile terminals MS (Mobile Station), the radio module 1 described in connection with FIG. 1 also being such a mobile station.

Figure 3:
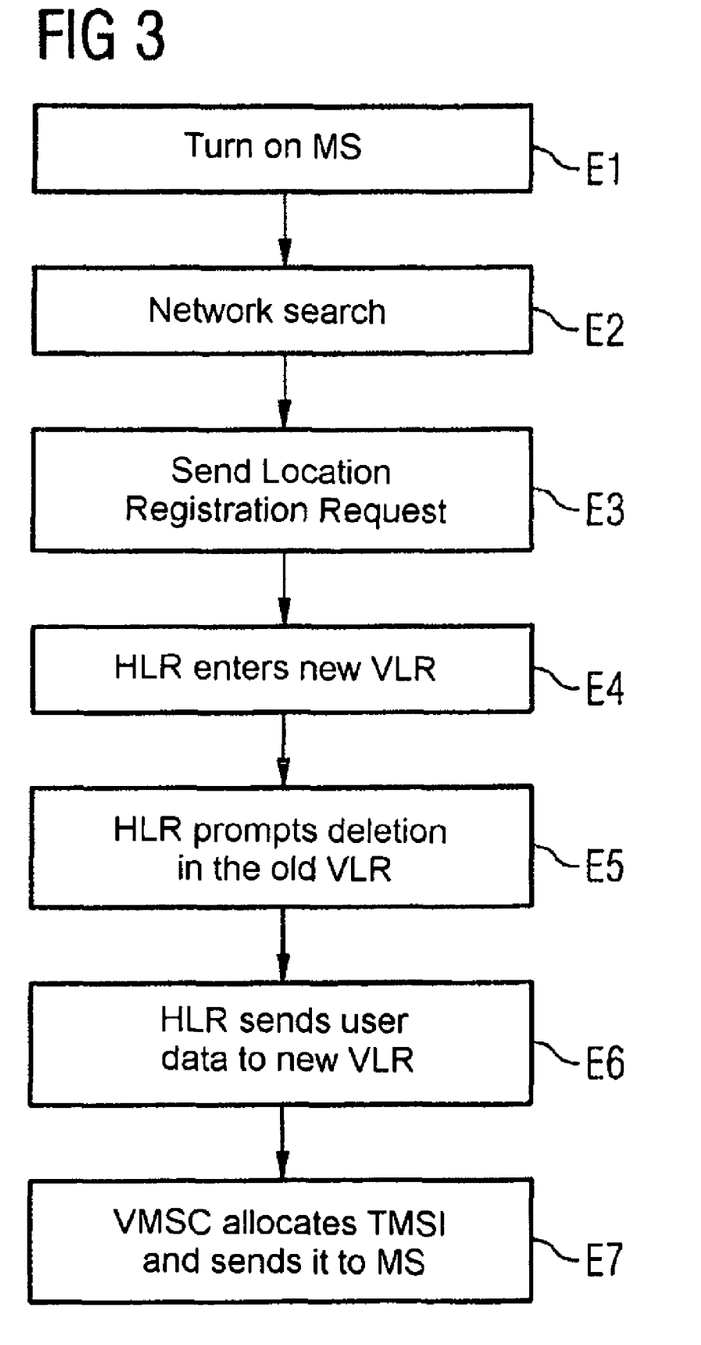
FIG. 3 is a simplified flowchart of the process for logging into a GSM network.

For the purpose of better understanding, the login process triggered by the login device 3 will now be described in more detail in connection with FIG. 3. When the radio module 1 has been turned on (E1), the radio module 1 starts the network search (E2). This involves measuring the intensity of various frequency channels and selecting that channel with the best reception which is associated with the radio module's own network and is not disabled for other reasons. Next, the radio module 1 sends its login request to the MSC 23 in the form of a Location Registration Request (E3). To perform login, the HLR 22 then puts in the VLR 24 which is responsible for the radio cell 27 associated with the radio module 1 (E4). In addition, the HLR 22 prompts deletion of the user data for the radio module 1 in the old VLR (E5), which might have been the VLR 24', for example. The HLR 22 also sends the user data to the new VLR 24 which is now responsible (E6). The MSC 23, which is now called the VMSC (Visited MSC), now allocates a temporary identifier (TMSI, Temporary Mobile Subscriber Identity) and sends it to the radio module 1 (E7). In the case of a static place of use for the radio module 1, this process is naturally shortened in as much as the old and new VLRs 24 are identical.

Figure 4:
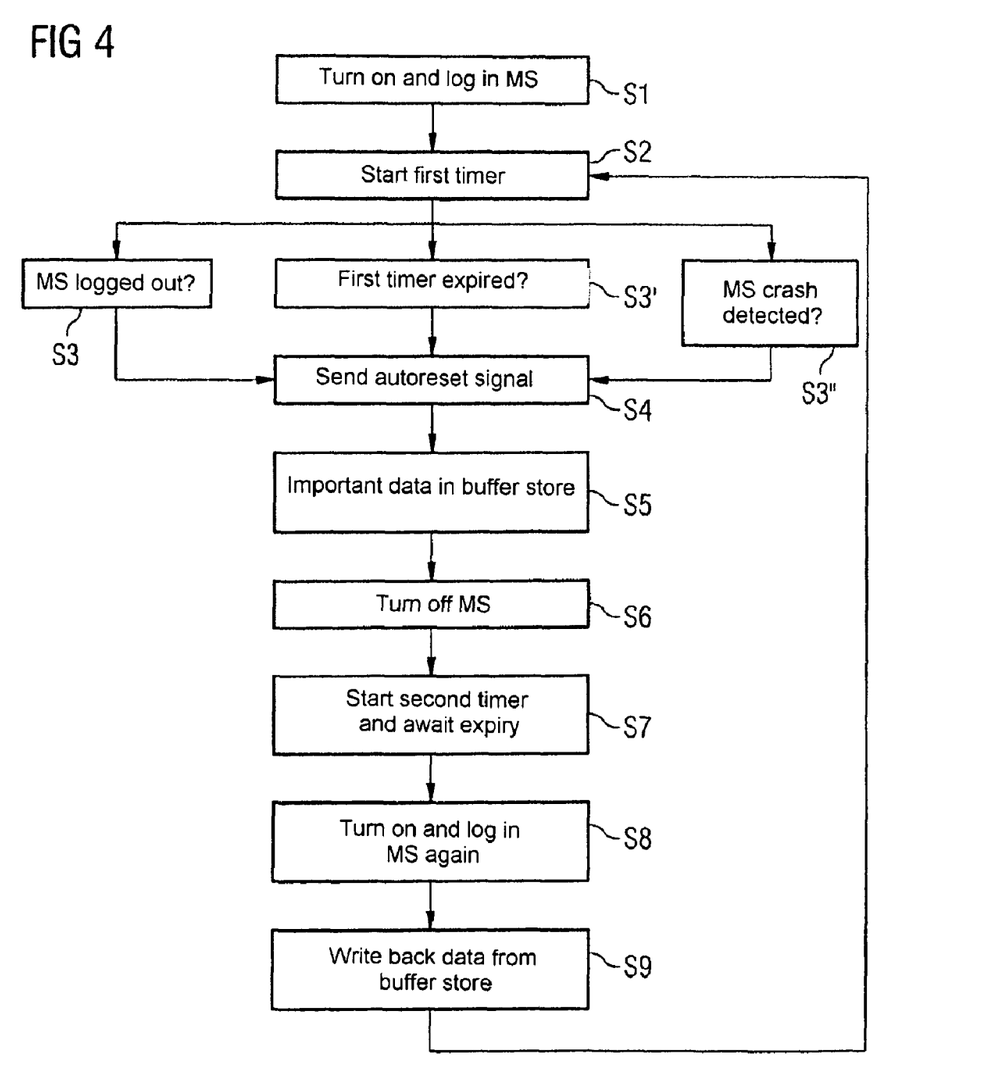
FIG. 4 is a flowchart illustrating the triggering a controlled autoreset under the exemplary embodiment.

With reference to FIG. 4, a more detailed explanation of the inventive method for triggering a controlled autoreset in the previously described radio module 1 will now be given. First of all, the radio module 1 logs into the radio network upon being turned on, as just described (S1). This starts the first timer 6 (S2). The radio module 1 now waits in a parallel loop for various possible events which are supposed to trigger an autoreset. This triggering event may be the radio module 1 being logged out by the radio network (S3). Alternatively, the first timer, which defines the period of the login by means of the time t_cycle_on, may also have elapsed (S3'). Finally, a crash in the radio module 1 may also have been detected (S3") either automatically by a piece of software or by an employee. If one of these events has occurred, the autoreset trigger device 5 generates the autoreset signal and sends it to the autoreset unit 7 (S4). The autoreset unit 7 then prompts all important data to be stored in the buffer store 11 (S5). The on/off switch 2 is then used to deactivate the radio module 1 (S6). In this case, the radio module 1 is deactivated only insofar as the autoreset unit 7 can still start the second timer 8 and can monitor its expiry (S7). In addition, the buffer store 11 can also still be supplied with power, despite the deactivation, if it is not a nonvolatile memory. When the second timer has expired, indicating that the timer t_cycle_off has elapsed, the autoreset unit 7 turns on the radio module 1 again, which then logs into the radio network again (S8). Following the login operation, the data is written back from the buffer store 11 to the locations from which they have been stored (S9). If data has already been required here for the login operation too, this write-back operation naturally needs to take place after turning on and before the login operation. The radio module 1 is now back in the same state as before the autoreset was triggered, and continues its monitoring procedure for a controlled autoreset in a loop at step S2 again by virtue of the first timer 6 being restarted.

A less hard autoreset is also conceivable, in which the radio module 1 is not restarted completely, but rather just a logout operation with subsequent renewed login is performed.

The choice of the two time intervals t_cycle_on and t_cycle_off can be optimized in terms of a few parameters. Such optimization parameters include the period of operation of the battery charge for the radio module 1, the total volume of transmitted data or the duration of such transmission operations or else the radiation load during sending. The activity cycles of the application running on the M2M radio module 1 can also affect these two time intervals. By way of example, it might be that the application is meant to send only on a particular day of the week.

An obvious optimization scheme for the times t_cycle_on and t_cycle_off might be that these times are chosen such that the radio module is logged in precisely at the times at which data transmissions are expected. By way of example, the time t_cycle_off may be chosen such that the radio module 1 turns off at times at which no activity is to be expected anyway. On the other hand, however, this time may also be chosen to be just 0 s if the application operates almost in real time. Finally, the parameter t_cycle_on may advantageously be chosen such that it is just slightly below the maximum permissible login time for the radio network, so that the radio module 1 is logged in practically at any time.

Alternatively, the choice of time intervals may be made by adapting these times using an automatic learning phase for the radio module 1. In this phase, the radio module 1 stores the disconnection times enforced by the radio network and the active and inactive times required by the application and produces an advantageous activation cycle for the radio module 1. In this context, the operating period with a battery charge can naturally be maximized, in particular.

Figure 5:
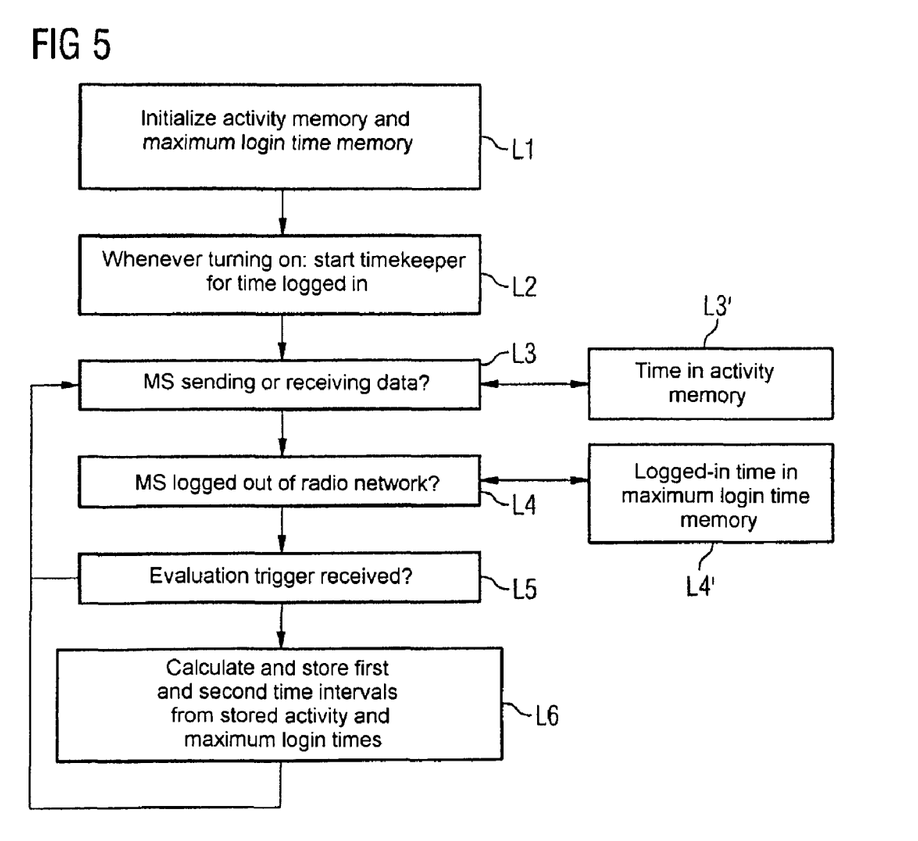
FIG. 5 is a flowchart illustrating an adaptive ascertainment of the first and second time intervals from activity and maximum login time data.

An adaptive learning phase of this type is shown in more detail in FIG. 5. In this case, the activity memory 10a and the maximum login time memory 10b are initialized at the start, for example when the radio module is assembled or else later at an arbitrary selected time (L1). Whenever the radio module 1 is turned on, an additional timekeeper is then started which measures the logged-in time of the radio module 1 (L2). A loop is then used to check whether the radio module 1 is sending or receiving data (L3), and the times at which such send or receive operations take place are stored in the activity memory 10a (L3'). In addition, a request is sent regarding whether the radio module 1 has been logged out of the radio network (L4) and the logged-in time of the radio module 1, measured by the additional timekeeper, is stored in the maximum login time memory 10b (L4').

The evaluation unit 10 then checks whether it has received an evaluation trigger (L5). Such an evaluation trigger may have been input into the radio module 1 by radio or directly via the interface, or may be triggered periodically, for example. If the evaluation unit 10 does receive such an evaluation trigger, it calculates the two time intervals t_cycle_on and t_cycle_off from the stored activity and maximum login times on the basis of a prescribed optimization scheme (L6). The calculated times are then transferred to the first and second timers 6, 8 via the input units. Next, or if no evaluation trigger has been received, a further loop pass begins (at L3).

Figure 6:
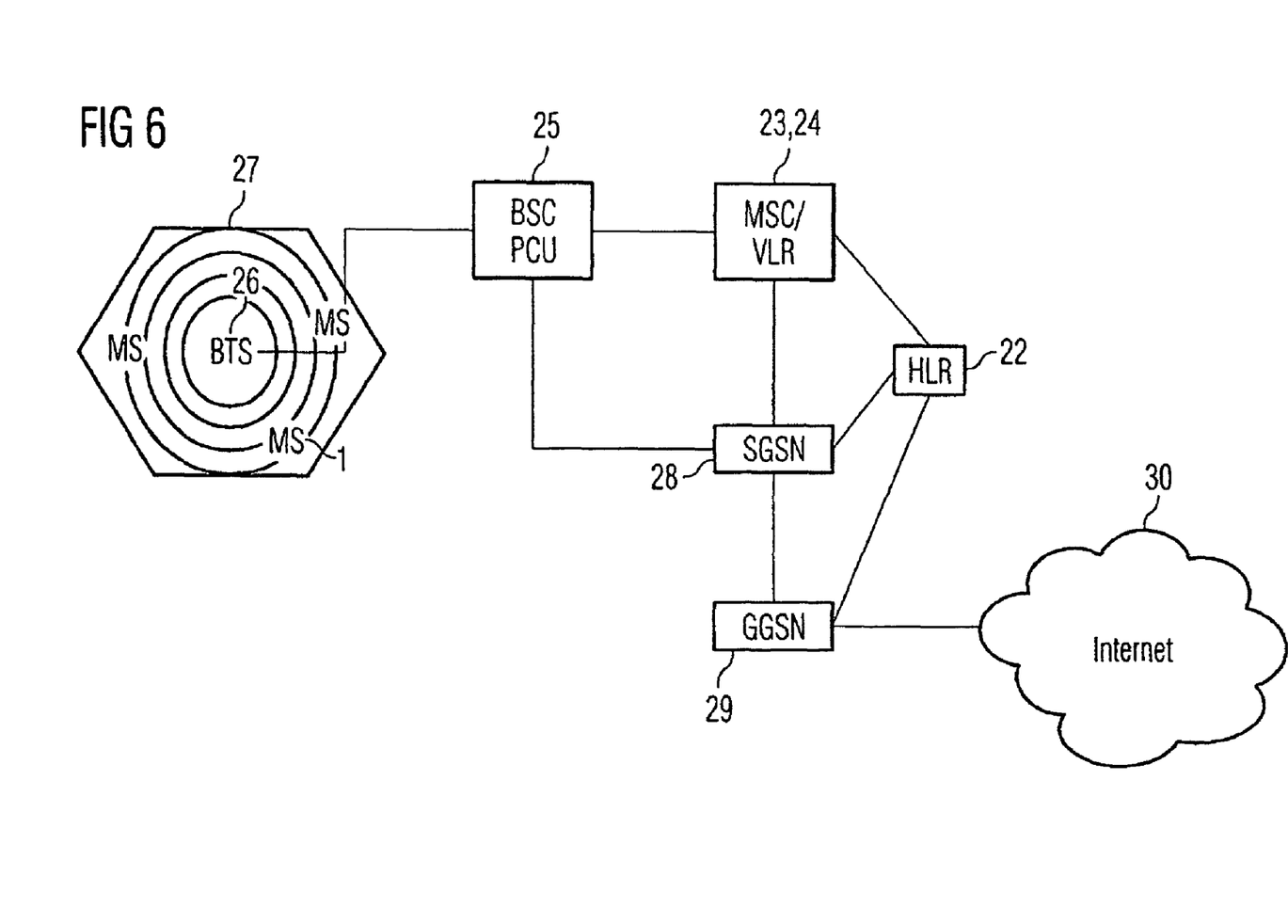
FIG. 6 is a schematic illustration of a GPRS network.

Although the inventive method for the radio module 1 has been described in connection with the GSM network today, it can be extended to any cellular radio standards. As a further example, FIG. 6 shows a GPRS network schematically and in simplified form. This differs from the GSM network from FIG. 2 in that a connection between the radio module 1 and the Internet 30 also runs via further nodes beyond the usual GSM connection, in order to support a packet-oriented data format. The fundamental difference from the GSM network is that an SGSN 28 and a GGSN 29 are additionally provided (Serving or Gateway GPRS Support Note) which are responsible for routing the data packets. The BSC 25 is extended by a PCU (Packet Control Unit) in order to be able to transmit these data packets to the radio module 1 in the radio subsystem too.

As revealed by the brief description of a GPRS network which has just been given, the functionality of the invention is not at all dependent thereon. The radio module 1 can thus also be readily used in a GPRS network.

Figure 7:
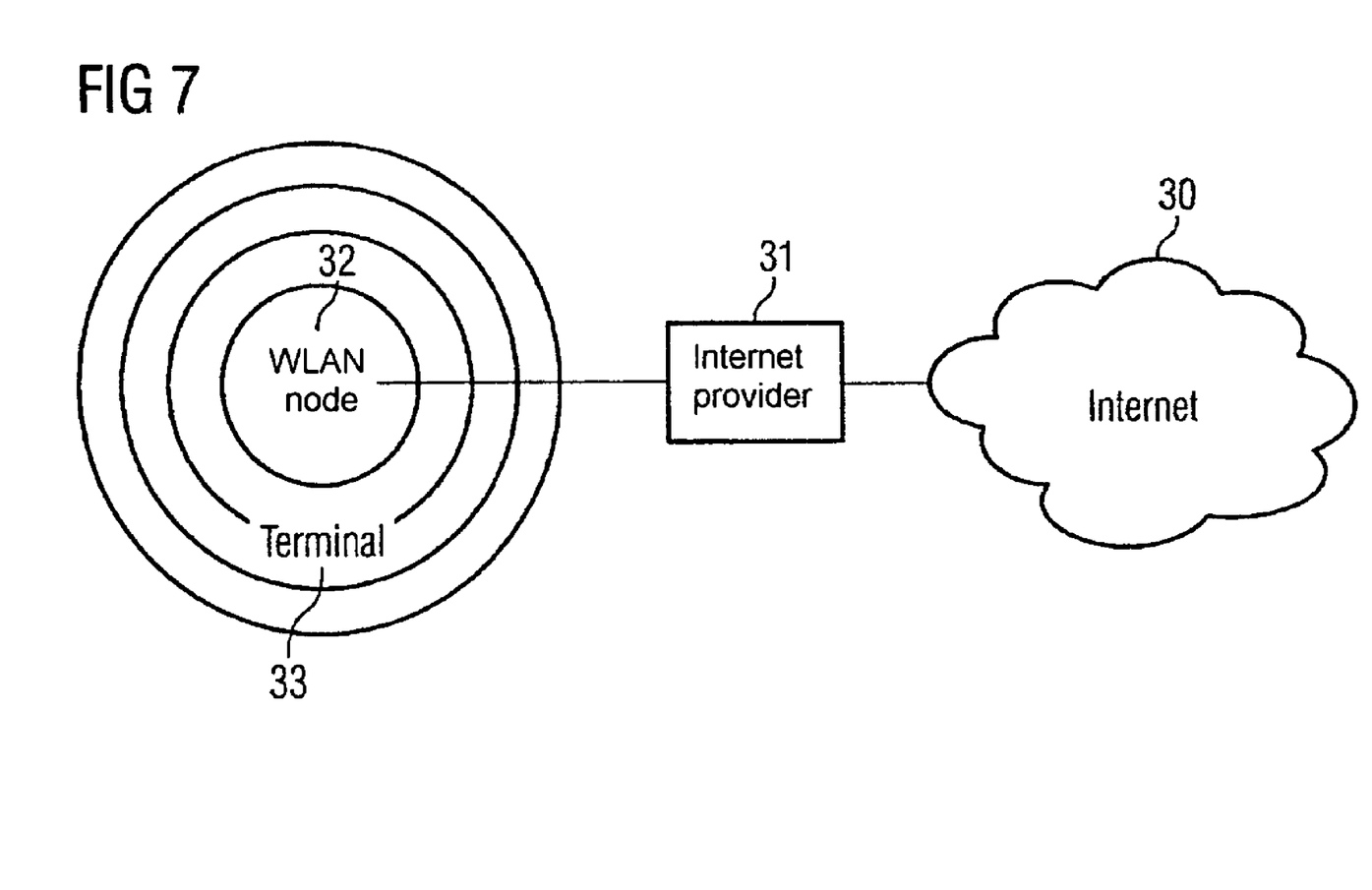
FIG. 7 is a schematic illustration of a WLAN network.

As a further example of another network standard, a WLAN will be described in connection with FIG. 7. In this case, the bridgehead to the Internet 30 is an Internet provider 31 which is connected to a server or WLAN Node 32. This WLAN node 32 is in radio connection with a terminal 33. This terminal may be any terminal, for example a notebook, a PDA or another appliance with a WLAN interface. In this case, the radio module 1 would be connected to the terminal 33 or integrated therein. The functionality of the radio module 1 is not dependent on the radio standard used in this case either.

Similarly, the invention may naturally be extended to further cellular radio standards, such as UMTS.

The invention thus achieves the described advantages that the radio module 1 can remain logged into the radio network constantly or at least at the necessary times, even if the provider provides a maximum time for this and logs out the radio module 1 after this time has elapsed. A remedial solution involving the production of pseudo data traffic, such as an SMS message with no content, can be avoided in this way. In addition, the solution is very robust, since the radio module 1 simply starts up again and automatically logs in even after a crash. By setting the two times t_cycle_on and t_cycle_off, it is also possible to optimize parameters/functions (call length, field strength loading, charging cycles). This optimization can be remotely controlled by radio and is also dynamic as a result of the learning mechanism described.

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims.

| List of reference symbols | |
|---|---|
| 1 | Radio module |
| 2 | On/off switch |
| 3 | Login device |
| 4 | Transceiver |
| 5 | Autoreset trigger device |
| 6 | First timer |
| 6a | Input unit |
| 6b | Time interval memory |
| 7 | Autoreset unit |
| 8 | Second timer |
| 8a | Input unit |
| 8b | Time interval memory |
| 9 | Time reset unit |
| 10 | Evaluation unit |
| 10a | Activity memory |
| 10b | Maximum login time memory |
| 11 | Buffer store |
| 20 | Landline network |
| 21 | GMSC |
| 22 | HLR |
| 23 | MSC |
| 24 | VLR |
| 25 | BSC |
| 26 | BTS |
| 27 | Radio cell |
| 28 | SGSN |
| 29 | GGSN |
| 30 | Internet |
| 31 | Internet provider |
| 32 | WLAN node |
| 33 | Terminal |

The invention claimed is:

1. A method for logging a radio module into a cellular radio network, comprising:
   receiving a login message from the radio module in the radio network; storing login data for the radio module in the radio network;
   deleting login data from the radio network when the radio module logs out;
   internally generating an autoreset signal in the radio module; and
   in response to an autoreset signal, an autoreset is automatically triggered in which the radio module is temporarily turned off and then on again or deactivates and registers again in the radio network.

2. The method as claimed in claim 1, wherein the autoreset signal is produced when the radio module is logged out of the radio network.

3. The method as claimed in claim 1, wherein the autoreset signal is produced in the radio module as soon as a first interval has elapsed.

4. The method as claimed in claim 3, wherein a second time interval is set for the radio module between turning off and turning on again in the event of the autoreset.

5. The method as claimed in claim 1, wherein the radio module turns on again immediately after turning off in the event of the autoreset.

6. The method as claimed in claim 4, wherein the first or second time interval can be set by radio command.

7. The method as claimed in claim 6, wherein maximum login time, after which the radio network logs out the radio module, or activity intervals are determined in which the radio module is supposed to be active, and these are adaptively used to determine the first or second time interval.

8. The method as claimed in claim 3, wherein the first time interval is restarted when the radio module sends data to the radio network or receives data from the radio network.

9. The method as claimed in claim 1, wherein data from volatile memory areas of the radio module is stored in non-volatile form or outside the radio module before the autoreset for the radio module, and is written back to the volatile memory areas after it is turned on.

10. The method as claimed in claim 1, wherein the radio network is one of a GSM network, a GPRS network, a UMTS network, an EDGE network and WLAN.

11. A radio module for a cellular radio network, comprising:
    a transceiver for sending and receiving messages;
    a login device connected to the transceiver, wherein the login device produces a login message and transmits it via the transceiver when the radio module is turned on'
    an auto reset trigger device which internally produces or receives an autoreset signal; and
    an autoreset unit connected to the autoreset trigger device for receiving the autoreset signal and disconnecting and subsequently reconnecting the radio module using the login device when said autoreset signal is received.

12. The radio module as claimed in claim 11, wherein the autoreset trigger device transmits an autoreset signal when a logout message is received, and wherein the logout message comprises information that the login data for the radio module has been deleted from the radio network.

13. The radio module as claimed in claim 11, wherein the radio module comprises a first timer for detecting when a first time interval has elapsed which is connected to the autoreset trigger device, which can output an autoreset signal when the first time interval has elapsed.

14. The radio module as claimed in claim 11, wherein the radio module comprises a second timer that detects when a second time interval has elapsed which is connected to the autoreset unit, the latter being designed to turn the radio module on again only after a delay by the second time interval after it has been turned off in the event of the autoreset.

15. The radio module as claimed in claim 14, wherein the first or the second timer comprises an input and a time interval memory and stores a time interval which has been input using the input unit to define the first or second time interval.

16. The radio module as claimed in claim 15, wherein the input unit is connected to the transceiver and defines the first or second time interval by radio command.

17. The radio module as claimed in claim 16, wherein the radio module further comprises:
    an activity memory that holds activity times for the radio module;
    a maximum login time memory that holds a maximum possible login time for the radio module in the radio network; and
    an evaluation unit;
    wherein the evaluation unit accesses the activity memory and the maximum login time memory and addresses the input unit to adaptively define the first and second time intervals.

18. The radio module as claimed in claim 13, further comprising:
    a time reset unit connected to the transceiver and to the first timer, wherein the time reset unit resets the first timer whenever data in the radio module has been sent to or received from the radio network.

19. The radio module as claimed in claim 11, further comprising:
   a nonvolatile buffer store for buffering data during autoreset even when the power supply for the rest of the radio module is interrupted.

20. The radio module as claimed in claim 11, wherein the radio module is one of a GSM module, a GRPS module, a UMTS module, an EDGE module and a WLAN module.

* * * * *